(12) United States Patent
Kayama et al.

(10) Patent No.: US 11,002,369 B2
(45) Date of Patent: May 11, 2021

(54) HIGH SEALING PROPERTY BALL VALVE SEAT

(71) Applicant: Nippon Carbon Co., Ltd., Tokyo (JP)

(72) Inventors: Toyohiko Kayama, Kokubunji (JP); Tatsuya Tanii, Toyama (JP)

(73) Assignee: NIPPON CARBON CO., LTD., Tokyo (JP)

( * ) Notice: Subject to any disclaimer, the term of this patent is extended or adjusted under 35 U.S.C. 154(b) by 0 days.

(21) Appl. No.: 16/490,325

(22) PCT Filed: Mar. 2, 2017

(86) PCT No.: PCT/JP2017/008346
§ 371 (c)(1),
(2) Date: Aug. 30, 2019

(87) PCT Pub. No.: WO2018/158915
PCT Pub. Date: Sep. 7, 2018

(65) Prior Publication Data
US 2020/0292088 A1    Sep. 17, 2020

(51) Int. Cl.
*F16J 15/10*    (2006.01)
*F16K 5/06*    (2006.01)

(52) U.S. Cl.
CPC ........... *F16K 5/0689* (2013.01); *F16J 15/106* (2013.01)

(58) Field of Classification Search
CPC ........ F16K 5/0689; F16K 5/06; F16K 5/0668; F16K 5/067; F16J 15/10
See application file for complete search history.

(56) References Cited

U.S. PATENT DOCUMENTS

| | | | | |
|---|---|---|---|---|
| 4,269,391 A | * | 5/1981 | Saito | ........................ F16J 15/30 |
| | | | | 251/315.03 |
| 5,046,703 A | * | 9/1991 | Kamiyama | ........... F16K 5/0678 |
| | | | | 251/368 |
| 6,938,879 B2 | * | 9/2005 | Bancroft | ................ F16J 15/164 |
| | | | | 251/306 |
| 2016/0102768 A1 | | 4/2016 | Lo Cicero | |

FOREIGN PATENT DOCUMENTS

| | | |
|---|---|---|
| JP | 53-134236 A | 11/1978 |
| JP | 02-077368 U | 6/1990 |
| JP | 06-071975 U | 10/1994 |
| JP | 08-047820 A | 2/1996 |
| JP | 11-141699 A | 5/1999 |

(Continued)

OTHER PUBLICATIONS

English language International Search Report for PCT/JP2017/008346, dated May 30, 2017 (2 pages).

(Continued)

*Primary Examiner* — Marina A Tietjen
(74) *Attorney, Agent, or Firm* — Flynn Thiel, P.C.

(57) ABSTRACT

A ball valve seat in which a resin or metal impregnated graphite seal ring and an L-shaped metal retainer are integrated by a shrink fit method. The graphite seal ring is provided with a continuous rib having a height of 50 to 250 μm on the outer periphery of the graphite seal ring. The rib preferably has arc curve of radius R slopes on both sides of the rib from the top to the bottom, and the width L of the bottom of the rib is preferably 550 to 1100 μm.

8 Claims, 3 Drawing Sheets

(56) References Cited

FOREIGN PATENT DOCUMENTS

| | | |
|---|---|---|
| JP | 2001-336639 A | 12/2001 |
| JP | 2002-208199 A | 7/2002 |
| JP | 2004-270773 A | 9/2004 |
| JP | 2008-309224 A | 12/2008 |
| JP | 2009-008116 A | 1/2009 |
| JP | 2009-041776 A | 2/2009 |
| JP | 2009-103242 A | 5/2009 |
| JP | 2014-206213 A | 10/2014 |
| JP | 2015-203463 A | 11/2015 |

OTHER PUBLICATIONS

English language Written Opinion for PCT/JP2017/008346, dated May 30, 2017 (4 pages).

\* cited by examiner

HIGH SEALING PROPERTY BALL VALVE SEAT

TECHNICAL FIELD

The present invention relates to a high sealing property ball valve seat used under high temperature and high pressure condition, and more particularly to a high sealing property ball valve seat that prevents leakage between a graphite seal ring and a metal retainer.

BACKGROUND ART

The ball valves control the flow rate and open or close the flow path by rotating the spherical, hemispherical or cylindrical valve body actuated by a handle or a lever. As the ball valves have good sealing property and operability, it is widely used in the electric power industry, natural gas pipelines, petroleum refining plants, petrochemical plants, general chemical plant equipment, building installation, anti-pollution industries, general housing water and sewage installations, gas supply equipment etc.

The structure of the ball valve seal comprises an annular seal disposed between the surface of the valve ball and the valve case, and the seal member is held on the case by a retainer mounted inside the case. That is, the seal member between the ball and the case is constituted by a combination of a retainer and a seal ring.

The material of the seal member is selected depending on a kind of fluid, fluid pressure and temperature, but in particular, when used under pressure higher than 2 MPa, and at temperature over 200° C. or 350° C. to 500° C. at maximum, and resin impregnated graphite or metal impregnated graphite is selected as a material of the seal.

Resin impregnated graphite materials have high resistant ability against alkaline and acidic fluid, and metal impregnated graphite materials can withstand alkaline and some acidic fluids. A ball valve seat using the graphite materials is fixed by shrink fitting a graphite seal ring (seal member) to the inside of a ring-shaped metal retainer.

In case the flow passage is suddenly closed or a sudden pressure change occurs due to the quick operation of the valve handle or the trunnion, the fluid enters into the gap between the retainer and the seal ring, and causes a peeling of the seal ring, which damages and reduces the sealing property. In addition, pressure acts on the back surface of the retainer and causes problems, namely, the displacement of the retainer from the right position.

In order to prevent these accidental phenomena, the ball valve seat interposed between the spherical, hemispherical, cylindrical valve body and the inside of the valve case is integrated with the seal ring and the retainer which are the ball pressure contact portion of the pressure under high temperature.

And it has also been proposed to use a seal ring formed by covering expansive graphite that can deform depending on a change of the pressure under the high temperature with metal foil, metal wire or metal mesh, or sandwiching metal foil, metal wire or metal mesh inside the expansive graphite.

But the strength of the ball valve seat is still not sufficient for the usage under high temperature and high pressure.

PRIOR ART DOCUMENTS

Patent Documents

1. JP H11-141699(1999-141699)
2. JP 2004-270773
3. JP 2001-336639
4. JP 2008-309224
5. JP 2009-41776
6. JP 2009-103242
7. JP 2009-8116
8. JP 2014-206213
9. JP 2015-203463

DISCLOSURE OF THE INVENTION

Technical Problems

According to the conventional manufacturing method of shrink fitting, there exists a gap between the metal retainer and the graphite seal ring impregnated with resin or metal, which causes a problem of fluid leakage. To solve this problem, the resin sheet seal member is inserted between the graphite seal ring and the retainer. However, the prevention of leakage is not sufficient, and it is not possible to completely prevent leakage, particularly under conditions of high pressure and high temperature.

An objective of the present invention is to improve the sealing performance of a ball valve seat of a resin or metal-impregnated graphite seal ring fitted to a metal retainer by a shrink fitting method being used under high pressure and high temperature and to prevent leakage.

Means for Solving the Problems

There is provided a rib of 50 to 250 μm in height on the outer periphery of a graphite seal ring made of a graphite material impregnated with a resin or a metal, and the sealing property between the shrink fitting metal retainer is improved for preventing leakage.

If the height of the rib is less than 50 μm, the leakage prevention effect of the seal is not sufficient. The height of the rib is preferably larger than 50 μm.

In addition, when the height of the rib exceeds 250 μm, the metal retainer does not expand large enough by heating to accept the sealing member having the rib larger than 250 μm in height, and the sealing member cannot be fitted in.

A height of 50 to 250 μm is appropriate and a more preferable rib height is 100 to 200 μm in order to properly fit inside the retainer for exhibiting a high sealing property.

The rib should be formed in a continuous manner on the outer periphery of the graphite seal ring. The number of ribs is at least one, and a plurality of ribs may be provided. When using an I-shaped section retainer, it is preferable to use 1 to 3 ribs, and when using an L-shaped section retainer, 1 or 2 ribs are preferable.

Although the base width of the rib is not particularly limited, and the rib is machined with a height of 50 to 250 μm so that it is preferable for facilitating the machining process, the rib has a form of curved slopes (R slope) from the top of the rib to the bottom on both sides. Preferably, the width of the rib base is 550 to 1100 μm.

Advantages of the Invention

When machining a graphite material impregnated with resin or metal for forming a graphite seal ring, the outer periphery of the graphite seal ring is ribbed at a height of 50 to 250 μm to form a seal between the graphite seal ring and the shrink fitting metal retainer. Sealing property between the graphite ring and the metal retainer is improved and leakage is prevented. And consequently, the conventional process of resin impregnation becomes unnecessary for preventing a leak, and it becomes possible to manufacture with low cost and saves time for manufacturing.

EMBODIMENTS

Figure 1:
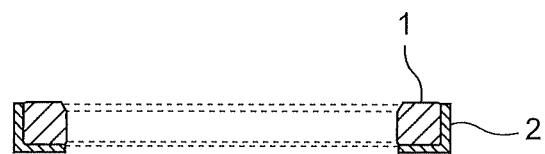
FIG. 1 is a cross-sectional view showing a valve seat.
Figure 2:
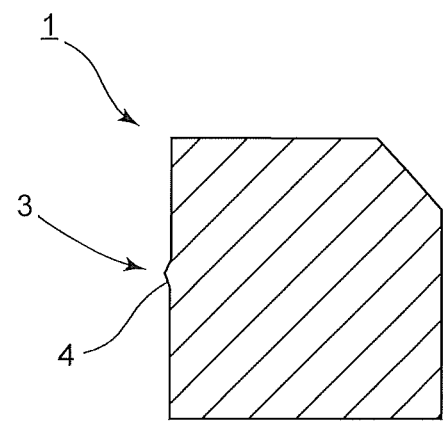
FIG. 2 is a cross-sectional view of a ribbed graphite seal ring.

The ball valve used under high temperature and high pressure conditions, commonly has a ball valve seat comprising an integrated structure of a metal retainer and a graphite seal ring impregnated with resin or metal assembled by a shrink fitting method. There exists a gap between the metal retainer and the graphite seal ring and through which a leakage occurs. For preventing this leakage, it is necessary to take preventive measures such as filling a resin between the graphite seal ring and the metal retainer. However, when in operation at high temperatures of over 350° C. and up to 500° C., there still remains a problem of the heat resistance characteristics of the resin to be filled so that the resin filling is not considered to be a fundamental solution.

For the purpose of improving the sealing property of the ball valve seat in which the resin or metal impregnated graphite seal ring 1 which is shrink fitted to a metal retainer 2 used under high pressure and high temperature, it is proposed to form at least one rib 3 having a height of 50 to 250 μm and a width of 550 to 1100 μm, the sealing property between the metal retainer 2 and the seal ring 1 is greatly improved and a high sealing property ball valve seat without resin filling will be obtained.

The ribs are formed simultaneously when the graphite ring is cut out from the raw material by machining, but it is difficult to manufacture precisely ribs having the height less than 50 μm.

In the case of an I-section type metal retainer, a position of the rib can be anywhere in the contact surface of the graphite seal ring wall, as the contact surface of the graphite seal ring becomes parallel to the surface of the retainer after both members are shrink fitted together. In case of an L-section shaped metal retainer, the graphite seal ring does not thermally expand uniformly under the heat condition, and a gap between the ball contact portion side of the graphite seal ring and the retainer and a gap between the valve case side and the graphite seal ring retainer becomes different during shrink fitting. There is a deformation and the gap between them becomes larger and not parallel. For this reason, the position of the rib should be closer to the retainer case side than the middle height of the graphite seal ring wall.

The manufacturing process of the graphite seal ring of the present invention will be described below.

Shrink Fitting

Shrink fitting is one of a shaft and a hole fitting methods. At normal temperature, the diameter of the hole smaller than the diameter of the shaft is heated and the diameter of the hole becomes larger than that of the shaft by expansion of the material. And the shaft is inserted into the enlarged diameter and is cooled. Then cooled and the diameter of the hole becomes to the original size and both members are fit together tightly. The following theoretical formula holds. The shrink fitting pressure (pressure of the contact surface) Pm when two hollow round bars of shrink fitting (diameter difference) δ are fitted by shrink fitting can be obtained by the following equation.

$$p_m = \frac{\delta}{2r_2} \left\{ \frac{1}{E_1} \left( \frac{r_2^2 + r_1^2}{r_2^2 - r_1^2} - v_1 \right) + \frac{1}{E_2} \left( \frac{r_3^2 + r_2^2}{r_3^2 - r_2^2} + v_2 \right) \right\}^{-1}.$$  [Equation 1]

Where: $E_1$: longitudinal elastic modulus of the inner cylinder, $v_1$ Poisson's ratio, $r_1$: inner radius, $r_2$: outer radius, $E_2$: longitudinal elastic modulus of the outer cylinder, $v_2$: Poisson's ratio of the outer cylinder Poisson's ratio, $r_2$: inner radius, $r_3$: outer radius Specifically, a member such as a metal disk with a hole (metal ring) is heated and expanded for allowing insertion of an axis slightly larger than the diameter of the hole and cooled, and then the metal member is contracted to fit tightly together with the axis.

Seal Member

The material of the seal member is appropriately selected depending on the fluid to be used, the pressure, the temperature, and the properties of the fluid to be used. When the operating conditions are a pressure higher than 2 MPa and a temperature exceeding 200° C. and a maximum of 350° C., a graphite material impregnated with a resin is selected, specifically products of Nippon Carbon Co., Ltd. Japan, NHC-7E3 (bulk specific gravity 1.8. Shore hardness 95, compressive strength 240 MPa, heat resistant temperature 350° C., HC-6E3 (bulk specific gravity 1.8, shore hardness 90, compressive strength 180 MPa, heat resistant temperature 350° C.), NS-103 E (bulk specific gravity 1.8, Shore hardness 85, compressive strength 230 MPa, heat resistant temperature 350° C.) are selected, which are adaptable to alkaline and acidic fluids. When used in a temperature range exceeding 350° C. and 500° C., a metal-impregnated graphite material is selected. Specifically, NC-S 76 (bulk specific gravity 2.7, Shore hardness 80 manufactured by Nippon Carbon Co., Ltd.) (Compressive strength 225 MPa, heat resistant temperature 500° C.) is preferable, and it can be applied to alkaline fluids and some acidic fluids.

The seal member is preferably graphite material in view point of machinability and the nature of slidability. Materially, after mixing and coking graphite powder and binder such as pitch under heating temperature of 80 to 150° C., the mixture is cast by extrusion, molding, CIP (Cold Isostatic Pressing) or the like, under non-oxide atmosphere, baking at 800 to 1300° C. gradually raising the temperature, and then transferred to a graphitizing furnace, and gradually raising the temperature in a non-oxygen atmosphere to obtain graphite material at maximum temperature of 3200° C.

Practically, there is no problems in machinability and slidability in the obtained graphite material as long as the graphitizing temperature is higher than 2000° C.

On the other hand, when the graphitizing temperature is higher than 2800° C., the hardness of the obtained graphite material becomes lower, and a problem may occur in the abrasion resistance. Graphitization at higher than 2000° C. is preferred because the graphite material graphitized lower than 2000° C. becomes too hard for machining.

Shape of the Rib

Figure 3:
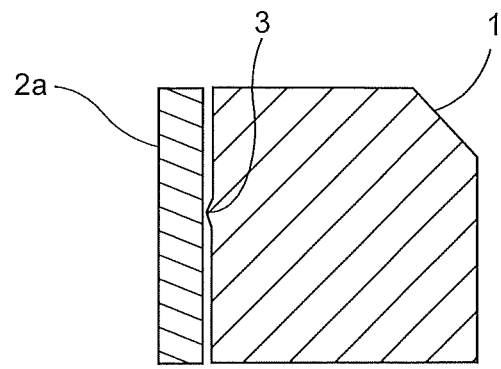
FIG. 3 is a cross-sectional view of a valve seat with a I-shaped retainer.
Figure 4:
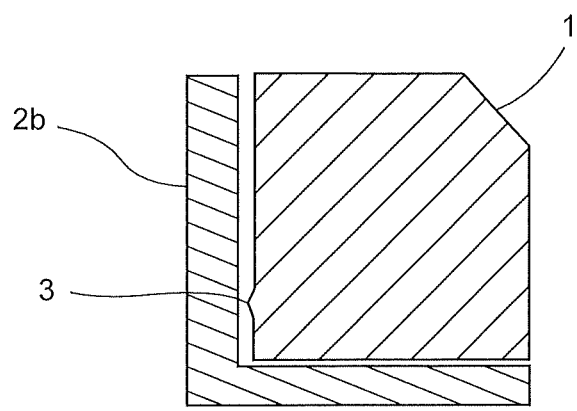
FIG. 4 is a cross-sectional view of a valve seat with an L-shaped retainer.

The rib 3 should be formed at least one continuously around the outer peripheral portion of the graphite seal ring 1. In case the of an I-shaped type retainer 2a shown in FIG. 3, the number of the ribs is 1 to 3, and in case of an L-shaped type retainer 2b shown in FIG. 4, the number of ribs is 1 to 2.

Figure 5:
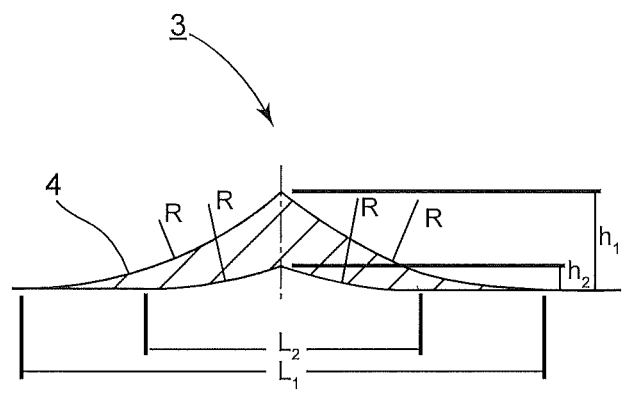
FIG. 5 is an enlarged cross-sectional view of a rib.

An enlarged sectional view of the rib 3 is shown in FIG. 5. The cross-section shape of the rib 3 is a mountain shape having a curved slope, and the width of the rib 3 is appropriately determined according to the height of the rib 3. From the limitation of machining, the minimum height $h_2$ of the rib 3 is 50 μm, and the maximum height $h_1$ is 250 μm. The slope from the top to the bottom of the rib 3 is preferably an arc curve surface 4 of radius R, where R is preferably 550 to 1100 μm.

Impregnation Agent for Graphite Seal

Impregnation agents for graphite sealing materials include resins or metals.

As to the resin, a phenol resin, furan resin, etc. are the main agents. A impregnated graphite with resins is charged into a pressure-resistant container made of metal, and is vacuumed to reduce pressure. And after even pores existing in the graphite material becomes vacuumed, liquid resin dissolved in a solvent is poured and further pressurized for impregnation of the resin into pores. The impregnation process is repeated if necessary. After the impregnation, the solvent is removed and the resin is cured by heat treatment at a temperature of 180 to 250° C.

Examples of the metals for impregnation are copper, copper alloy, silver, tin, antimony, antimony alloy, aluminum, aluminum alloy and the like. A graphite material is put into a pressure container made of metal and evacuated, and then the graphite material is immersed in a molten metal and impregnated under pressure.

Retainer Member

It should be a metal as the retainer member that can withstand the pressure, the temperature and properties of the fluid (alkaline or acidic) the retainer is exposed. Consequently, stainless steel, nickel alloy, nickel or titanium is preferable. Among stainless steels, SUS316, SUS316L, SUS317L, SUS329L, SUS329J, etc. are preferably selected. Among nickel alloys, ALLOY 20, HASTERLLOY C, HASTELLOY B, INCONEL 600, MONEL and the like are preferably selected.

Shape of Retainer

The shape of the retainer is of two types: a simple cylindrical shape (I-shaped type) and a shape (L-shaped type) in which a part of the retainer is into the housing portion.

In case of the I-shaped type retainer, the inner surface of the retainer is maintained parallel to the outer periphery of the graphite seal ring after shrink fitting, but in the case of the L-shaped type retainer, when heated, the cylindrical head and leg expand from the heel side. The gap on the head side of L becomes large and it is warped upward, and the retainer and the graphite seal ring do not become parallel because the state is maintained even if it is cooled. In this case, it is necessary to position the rib of the graphite seal ring on the L side of the leg.

Example 1

When the sealing is in work at a maximum temperature of 500° C., the inner diameter of the metal retainer is determined based on the thermal expansion of the metal retainer at 500° C. The shrink fit allowance is expressed as the outer diameter of a graphite seal ring (the inner diameter of the retainer at 500° C.—inner diameter of retainer at normal temperature)+α, where α is a value close to zero. If α is set to a rather large value, the retainer and the graphite fitted together strongly and the seal ring will not be easily released from the retainer, but the bigger strain will occur due to cooling after the shrink fit process. Therefore, the shrink fit allowance and the inner diameter of the metal retainer should be determined taking into account these relationship.

The material of the metal retainer is SUS329J1, then the thermal expansion at 500° C. is calculated from the coefficient of thermal expansion, and the inner diameter of the retainer (type I) is calculated as 97.3 mm. Graphite seal member NC-S76 (bulk specific gravity 2.7, shore hardness 80, compressive strength 225 MPa, heat resistance temperature 500° C.) manufactured by Nippon Carbon Co., Ltd., outer diameter 97.8 mm outer diameter by machining the graphite material. One rib having a height of 150 μm is formed at the center of the width of the seal member. The width of the rib is 832 μm, and the R of the rib slope is 800 μm.

Next, the metal retainer is heated to 700° C. for enlarging the diameter, and the ribbed graphite seal ring is fitted into the thermally enlarged metal retainer and allowed to cool to complete shrink fitting.

Example 2

Same as the Example 1 except that the inner diameter of the retainer (type I) is 67.6 mm, the outer diameter of the graphite seal ring is 67.9 mm, the height of the rib on the outer peripheral portion is 100 μm, the width of the rib is 778 μm, and the R of the slope is 800 μm.

Example 3

The material of the metal retainer is SUS316, and the thermal expansion at 500° C. is calculated from the coefficient of thermal expansion, and the inner diameter of the retainer (L-shaped type) is machined to 183.6 mm.

As a graphite seal member, NC-S76 (bulk specific gravity 2.7, shore hardness 80, compressive strength 225 MPa, heat resistance temperature 500° C.) made by Nippon Carbon Co., Ltd. is used and machined on the outer periphery of 185.0 mm in outer diameter. One rib with a height of 150 μm, a rib width of 832 μm, and a slope radius of 800 μm is installed at a position closer to the valve case side by 15% from the center of the width of the graphite seal ring.

Thereafter, the metal retainer is heated to 700° C. and expanded in the same manner as in Example 1. The ribbed graphite seal ring is then fitted into a thermally expanded metal retainer and allowed to cool to complete the shrink fitting.

Example 4

The internal diameter of the retainer (L-shaped type) is 243.4 mm, the outer diameter of the graphite seal ring is 245.0 mm, the height of the rib installed on the outer peripheral part is 150 μm, the width of the rib is 832 μm, and the R of the slope is 800 μm. It carried out similarly to Example 3.

Comparative Example 1

The material of the metal retainer is SUS329J1, the thermal expansion at 500° C. is calculated from the coefficient of thermal expansion, and the inner diameter of the retainer (L-shaped type) is processed to 67.5 mm.

It is made into external dimensions 67.9 mm by machining using Nippon Carbon Co., Ltd. NC-S76 (bulk specific gravity 2.7, Shore hardness 80, compressive strength 225 MPa, heat-resistant temperature 500° C.) as a graphite sealing member.

The metal retainer is heated to 700° C. and expanded. The graphite seal ring is fitted into the thermally expanded metal retainer and allowed to cool to complete the shrink fitting.

Comparative Example 2

Comparative Example 1 is carried out in the same manner as Comparative Example 1 except that the inner diameter of the retainer (L-shaped type) is 97.2 mm and the outer diameter of the graphite seal ring is 97.8 mm.

Leak Test

The leak test is conducted using the graphite seal ring of the Examples of this invention, and comparative examples, and the liquid leakage prevention performance of this invention is confirmed.

Test 1

Figure 6:
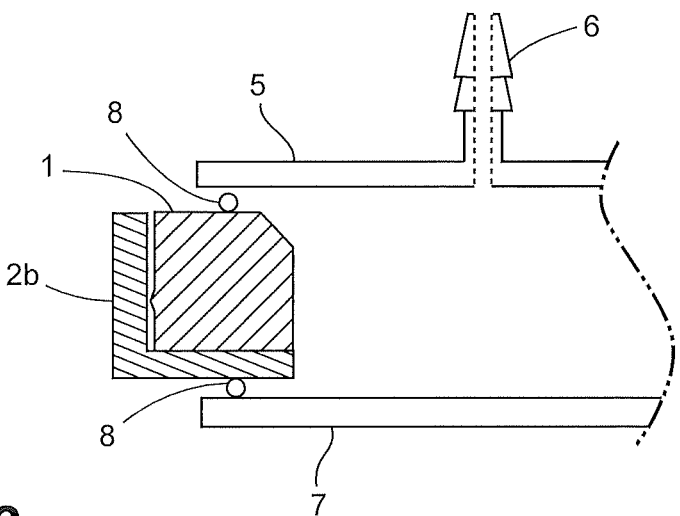
FIG. 6 is a cross-sectional view (portion) of a ball valve seat sandwiched by a leak test jig.

As shown in FIG. 6, the ball valve seats of the embodiments 1 to 4 are sandwiched between the upper cover 5 having a metal nozzle 6 and a lower cover 7 and the packings 8, 8 are placed between the covers 5,7 and the ball valve seat, which is placed in the water. A hose for air blowing is attached to the nozzle 6. Then, 3.5 MPa compressed air is blown into the ball valve seat through the hose and the nozzle 6 and kept blowing for 5 minutes to carry out a leak test. The ball valves of examples 1 to 4 are prepared five pieces each and subjected to a leak test twice. But no air bubbles leakage between the metal retainer and the graphite seal ring is observed.

Test 2

Two ball valve seats of each of Examples 1 and 2 are placed in a thermostatic chamber kept at 450° C. and held for one hour. After exposure of the heat condition, the same leak test described above is repeated twice as in the leak test 1 of Example 4, but no bubbles leaked from between the metal retainer and the graphite seal ring is observed.

The ball valves of Comparative Examples 1 and 2 are prepared 5 pieces each, and the leak test is conducted twice each, but in both Comparative Examples 1 and 2, bubbles are observed leaking from the metal retainer and the graphite seal ring in several seconds.

From the results described above, it is confirmed that the ball valve seat comprising the graphite seal ring and the metal retainer of the present invention having ribs is effective in preventing liquid leakage.

LIST OF REFERENCES 1 graphite seal ring
2 metal retainer
2a I-shaped metal retainer
2b L-shaped metal retainer
3 rib
4 R curved surface of rib
5 upper cover
6 nozzles
7 lower cover
8 packing

The invention claimed is:

1. A high sealing property ball valve seat comprising a metal ring retainer and a graphite seal ring attached to one another by shrink-fitting, the metal ring retainer being disposed in surrounding relation with the graphite seal ring, the graphite seal ring having an outer periphery facing the metal ring retainer and a continuous rib projecting outwardly from the outer periphery so as to have a height of 50 to 250 μm, the rib being disposed in contacting relation with the metal ring retainer to prevent leakage between the metal ring retainer and the graphite seal ring, the rib having a cross-section comprising a base disposed immediately adjacent the outer periphery of the graphite seal ring, a vertex spaced from the base and a pair of sloped sides disposed on respective opposite sides of the vertex and extending between the vertex and the base.

2. The high sealing property ball valve seat according to claim 1, wherein the sloped sides of the rib are curved.

3. The high sealing property ball valve seat according to claim 1, wherein a graphite material of the graphite seal ring is impregnated with a resin or a metal.

4. The high sealing property ball valve seat according to claim 1, wherein the graphite seal ring is graphitized at 2000° C. or higher.

5. The high sealing property ball valve seat according to claim 1, wherein each of the sloped sides of the rib are curved and have a radius of curvature of 550 to 1100 μm.

6. A ball valve seat comprising:
a graphite seal ring having an annular surface forming an outer periphery of said graphite seal ring, and a rib projecting outwardly from said annular surface and extending continuously around said outer periphery, said rib having a height of 50 to 250 μm; and
a metal retainer ring having an annular surface forming an inner periphery of said metal retainer ring, said metal retainer ring being disposed in surrounding relation with said graphite seal ring such that said annular surface of said metal retainer ring is disposed in facing relation with said annular surface of said graphite seal ring, said metal retainer ring and said graphite seal ring being attached to one another by shrink-fitting, said rib of said graphite seal ring being disposed in contacting relation with said annular surface of said metal retainer ring to prevent leakage between said graphite seal ring and said metal retainer ring, and said rib having a cross-section comprising a base disposed immediately adjacent said annular surface of said graphite seal ring, a vertex spaced from said base and a pair of sloped side surfaces disposed on respective opposite sides of said vertex and extending between said vertex and said base.

7. The ball valve seat according to claim 6, wherein said sloped side surfaces are curved.

8. The ball valve seat according to claim 7, wherein the sloped side surfaces each have a radius of curvature of 550 to 1100 μm.

\* \* \* \* \*